United States Patent
Wang et al.

(10) Patent No.: US 11,637,289 B2
(45) Date of Patent: Apr. 25, 2023

(54) COMPOSITIONS AND METHODS FOR PARALLEL PROCESSING OF ELECTRODE FILM MIXTURES

(71) Applicant: Tesla, Inc., Austin, TX (US)

(72) Inventors: Ziying Wang, San Diego, CA (US); Haim Feigenbaum, Irvine, CA (US); Hieu Minh Duong, Rosemead, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 17/227,110

(22) Filed: Apr. 9, 2021

(65) Prior Publication Data

US 2021/0234173 A1 Jul. 29, 2021

Related U.S. Application Data

(62) Division of application No. 16/176,987, filed on Oct. 31, 2018, now abandoned.
(Continued)

(51) Int. Cl.
*H01M 4/04* (2006.01)
*H01B 1/24* (2006.01)
(Continued)

(52) U.S. Cl.
CPC .............. *H01M 4/623* (2013.01); *H01B 1/24* (2013.01); *H01G 11/28* (2013.01); *H01G 11/34* (2013.01); *H01G 11/86* (2013.01); *H01M 4/0445* (2013.01); *H01M 4/139* (2013.01); *H01M 4/621* (2013.01); *H01M 4/96* (2013.01); *H01M 10/0564* (2013.01)

(58) Field of Classification Search
CPC ... H01B 1/00; H01B 1/20; H01B 1/22; H01B 1/24; H01M 4/0404; H01M 4/0407; H01M 4/0409; H01M 4/043; H01M 4/70
See application file for complete search history.

(56) References Cited

U.S. PATENT DOCUMENTS

| | | | |
|---|---|---|---|
| 5,143,805 A | 9/1992 | Anderman | |
| 5,972,055 A * | 10/1999 | Gao | H01M 10/052 |
| | | | 29/623.5 |

(Continued)

FOREIGN PATENT DOCUMENTS

| | | |
|---|---|---|
| CN | 102447113 | 5/2012 |
| WO | WO 05/008807 | 1/2005 |

OTHER PUBLICATIONS

MTI Corporation, MCMB (MesoCarbon MicroBeads) Graphite Powder data sheet (no pub date).

*Primary Examiner* — Mark Kopec
(74) *Attorney, Agent, or Firm* — Knobbe Martens Olson & Bear, LLP

(57) ABSTRACT

Materials and methods for preparing electrode film mixtures and electrode films including reduced damage bulk active materials are provided. In a first aspect, a method for preparing an electrode film mixture for an energy storage device is provided, comprising providing an initial binder mixture comprising a first binder and a first active material, processing the initial binder mixture under high shear to form a secondary binder mixture, and nondestructively mixing the secondary binder mixture with a second portion of active materials to form an electrode film mixture.

20 Claims, 11 Drawing Sheets

Related U.S. Application Data

(60) Provisional application No. 62/580,931, filed on Nov. 2, 2017.

(51) Int. Cl.
    *H01M 4/62*     (2006.01)
    *H01M 4/96*     (2006.01)
    *H01M 10/0564*     (2010.01)
    *H01G 11/86*     (2013.01)
    *H01G 11/28*     (2013.01)
    *H01G 11/34*     (2013.01)
    *H01M 4/139*     (2010.01)

(56) References Cited

U.S. PATENT DOCUMENTS

| | | | |
|---|---|---|---|
| 6,391,069 B1 | 5/2002 | Gozdz | |
| 8,072,734 B2 * | 12/2011 | Zhong | H01G 11/38 361/511 |
| 2005/0266298 A1 | 12/2005 | Mitchell et al. | |
| 2006/0109608 A1 * | 5/2006 | Zhong | H01M 4/926 361/502 |
| 2006/0146479 A1 | 7/2006 | Mitchell et al. | |
| 2011/0045350 A1 | 2/2011 | Amos | |
| 2014/0098464 A1 | 4/2014 | Bendale et al. | |
| 2014/0335410 A1 | 11/2014 | Loveridge | |
| 2015/0017542 A1 | 1/2015 | Hirai | |
| 2015/0072234 A1 | 5/2015 | Mitchell et al. | |
| 2015/0255779 A1 * | 9/2015 | Hong | H01M 4/045 264/484 |
| 2015/0303481 A1 | 10/2015 | Duong et al. | |
| 2015/0349367 A1 | 12/2015 | Horibe | |
| 2017/0098826 A1 | 4/2017 | Mitchell et al. | |
| 2017/0244098 A1 | 8/2017 | Duong | |
| 2019/0237748 A1 | 8/2019 | Shin | |
| 2020/0358100 A1 * | 11/2020 | Duong | H01M 4/623 |
| 2021/0249657 A1 * | 8/2021 | Shin | H01M 4/587 |

\* cited by examiner

COMPOSITIONS AND METHODS FOR PARALLEL PROCESSING OF ELECTRODE FILM MIXTURES

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entirety under 37 CFR 1.57. This application claims the benefit as a divisional of U.S. Non-Provisional patent application Ser. No. 16/176,987, filed Oct. 31, 2018, entitled "COMPOSITIONS AND METHODS FOR PARALLEL PROCESSING OF ELECTRODE FILM MIXTURES," which claims the benefit of U.S. Provisional Patent Application No. 62/580,931, filed Nov. 2, 2017, entitled "COMPOSITIONS AND METHODS FOR PARALLEL PROCESSING OF ELECTRODE FILM MIXTURES."

BACKGROUND

Field of the Invention

The present invention relates generally to energy storage devices, and specifically to materials and methods for parallel processing of mixtures of electrode active materials and electrode binders.

Description of the Related Art

Electrical energy storage cells are widely used to provide power to electronic, electromechanical, electrochemical, and other useful devices. Such cells include batteries such as primary chemical cells and secondary (rechargeable) cells, fuel cells, and various species of capacitors, including ultracapacitors. Increasing the cycle life of energy storage devices, including capacitors and batteries, would be desirable for enhancing energy storage, increasing power capability, and broadening real-world use cases.

SUMMARY

For purposes of summarizing the invention and the advantages achieved over the prior art, certain objects and advantages of the invention are described herein. Not all such objects or advantages may be achieved in any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In a first aspect, a method for preparing an electrode film mixture for an energy storage device is provided, comprising providing an initial binder mixture comprising a first binder and a first active material, processing the initial binder mixture under high shear to form a secondary parallel processed binder mixture, and nondestructively mixing the secondary binder mixture with a second portion of active materials to form an electrode film mixture.

In another aspect, a parallel processing method for preparing an electrode film is provided. In some embodiments, the method includes providing an initial binder mixture comprising a first binder and a first active material. In some embodiments, the method includes processing the initial binder mixture under high shear to form a secondary binder mixture. In some embodiments, the method includes forming an electrode film mixture by mixing the secondary binder mixture with a second active material by a first nondestructive mixing process. In some embodiments, the method includes forming an electrode film from the electrode film mixture, wherein the electrode film is a free-standing film.

In some embodiments, mixing the secondary binder mixture with the second active material by the first nondestructive mixing process comprises mixing at least one of a lower pressure, lower velocity, and faster feed rate than the processing under high shear step. In some embodiments, the first binder and the first active material are mixed by a second nondestructive mixing process to form the initial binder mixture prior to providing the initial binder mixture. In some embodiments, at least one of the first and the second nondestructive mixing processes is an acoustic mixing process. In some embodiments, mixing comprises mixing the binder mixture with an active material mixture, the active material mixture comprising the second active material.

In some embodiments, the active material mixture further comprises a second binder. In some embodiments, the mass ratio of the first active material to the first binder is between about 1:1 to about 4:1 by weight. In some embodiments, the second active material comprises a treated surface. In some embodiments, the second active material within the electrode film comprises active material particle surfaces that are pristine. In some embodiments, the combined $D_{50}$ particle size distribution of a total active material, including the first and second active materials, in the electrode film mixture is at least about 6 μm. In some embodiments, the electrode film mixture is not exposed to a high shear process before being formed into the electrode film.

In another aspect, an electrode film for an energy storage device is provided. In some embodiments, the electrode film includes an active material comprising active material particles, wherein the $D_{50}$ size distribution of a total of the active material particles is at least about 6 μm. In some embodiments, the electrode film includes a binder. In some embodiments, the electrode film is a free-standing film.

In another aspect, an energy storage device is provided. In some embodiments, the energy storage device includes an anode comprising an electrode film, wherein the electrode film comprises an active material comprising graphite, and a binder comprising PTFE. In some embodiments, the energy storage device includes a cathode. In some embodiments, the energy storage device includes a separator. In some embodiments, the energy storage device includes an electrolyte. In some embodiments, the energy storage device has a first cycle efficiency of greater than about 85%.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 8A shows an example first cycle efficiency for a 1.5% PTFE film of 88.7%, and FIG. 8B shows an example first cycle efficiency for another 1.5% PTFE film of 91.0%.

DETAILED DESCRIPTION

Definitions

Figure 1:
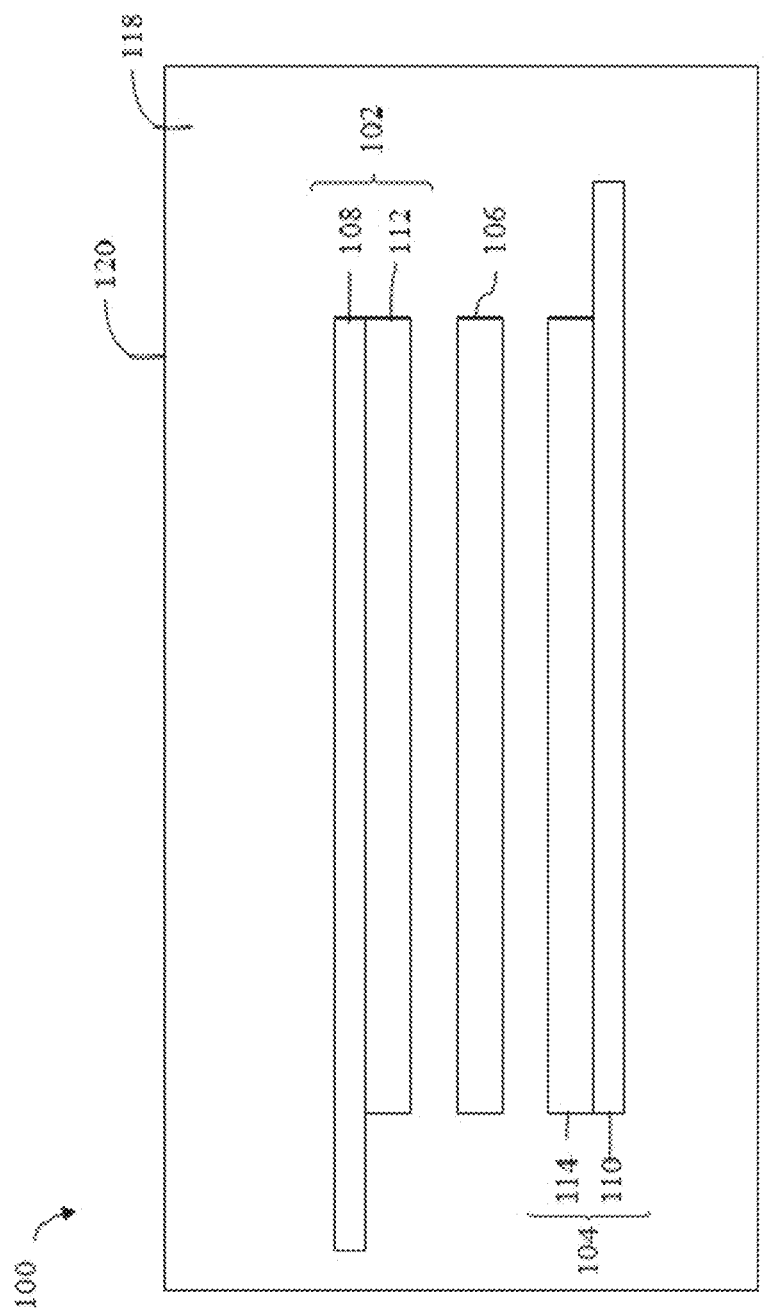
FIG. 1 depicts an embodiment of an energy storage device.

As used herein, the terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone, or operated as a component of a multi-cell system.

As used herein, the voltage of an energy storage device is the operating voltage for a single battery or capacitor cell. Voltage may exceed the rated voltage or be below the rated voltage under load, or according to manufacturing tolerances.

As provided herein, a "self-supporting" electrode film or active layer is an electrode film or layer that incorporates binder matrix structures sufficient to support the film or layer and maintain its shape such that the electrode film or layer can be free-standing. When incorporated in an energy storage device, a self-supporting electrode film or active layer is one that incorporates such binder matrix structures. Generally, and depending on the methods employed, such electrode films or active layers are strong enough to be employed in energy storage device fabrication processes without any outside supporting elements, such as a current collector or other film. For example, a "self-supporting" electrode film can have sufficient strength to be rolled, handled, and unrolled within an electrode fabrication process without other supporting elements.

As provided herein, a "solvent-free" electrode film is an electrode film that contains no detectable processing solvents, processing solvent residues, or processing solvent impurities. Processing solvents or traditional solvents include organic solvents. A dry electrode film, such as a cathode electrode film or an anode electrode film, may be solvent-free.

A "wet" electrode or "wet process" electrode is an electrode prepared by at least one step involving a slurry of active material(s), binder(s), and processing solvents, processing solvent residues, and/or processing solvent impurities. A wet electrode may optionally include additive(s).

As provided herein, a "nondestructive" process is a process in which an electrode active material, including the surface of the electrode active material, is not substantially modified during the process. Thus, the analytical characteristics and/or performance in an application, such as incorporation in an energy storage device, of the active material, are identical or nearly identical to those which have not undergone the process. For example, a coating on the active material may be undisturbed or substantially undisturbed during the process. A nonlimiting example of a nondestructive process is "nondestructively mixing or blending," or jet milling at a reduced pressure, increased feed rate, decreased velocity (e.g., blender speed), and/or change in other process parameter(s) such that the shear imparted upon an active material remains below a threshold at which the analytical characteristics and/or performance of the active material would be adversely affected, when implemented into an energy storage device. A "nondestructive" process can be distinguished from a high shear process which substantially modifies an electrode active material, such as the surface of an electrode active material, and substantially affects the analytical characteristics and/or the performance of the active material. For example, high shear blending or jet milling can have detrimental effects on the surface of an electrode active material. A high shear process may be implemented, at the detriment to the active material surface characteristics, to provide other benefits, such as fibrillization of binder material, or otherwise forming a binder/active material matrix to assist in forming a self-supporting electrode film. Embodiments herein provide similar benefits, while avoiding the detrimental effects of excessive use of high shear processes. In general, the nondestructive processes herein are performed at one or more of a higher feed rate, lower velocity, and/or lower pressure, resulting in a lower shear process than the more destructive processes that will otherwise substantially modify an electrode active material, and thus affect performance.

As provided herein, "binder loading" refers to the mass of binder relative to the mass of the final electrode film mixture. Binder loading can be expressed with respect to a single binder, or a "total binder loading" which is the sum of the mass of all types of binders relative to the mass of the final electrode film mixture.

Description

Under various operating conditions, a number of deleterious processes may take place at the surfaces of active materials. These processes may result in a reduction in performance over the life of the device, and may result in outright cell failure. Over the life of an energy storage device, deterioration of device performance may manifest as reduced storage capacity, capacitance fade, increased equivalent series resistance (ESR) of the device, self-discharge, pseudocapacity, and/or gas formation. Damaged electrode active materials are thought to contribute to these processes. Steps employed in typical, single path or serial dry electrode fabrication techniques generally include high shear and/or high pressure processing steps performed on all the dry electrode binder and active materials. Such high shear processing may damage the electrode active materials, and thus contribute to these aforementioned negative effects, once this raw material is formed into an electrode within an energy storage device. Thus, there is a need for electrode film mixtures and processes that include reduced damage bulk active materials.

Provided herein are various embodiments incorporating materials and methods by which parallel processes can be implemented for forming electrode film mixtures, electrode films, and energy storage devices incorporating the electrode films. An energy storage device as provided herein may be fabricated from an electrode film mixture as provided herein. Further, an energy storage device as provided herein may be constructed by a method as provided herein.

In typical dry electrode fabrication procedures, at least two problems could be identified. First, significant damage was done to the active material particles during high shear mixing methods such as jet mill processing, as evidenced by a reduction in particle size during jet mill processing. In a simplistic representation, it is believed that smaller particle sizes correspond with more damaged particles. Thus, high shear processing may damage active material particles. Without wishing to be limited by theory, it is thought that such damage may contribute to additional, undesired, reactions on the surfaces of active materials, for example, by revealing fresh and/or uncoated graphite step surfaces. Second, binders, while necessary for film cohesion, do not contribute to energy storage. These problems may contribute to reduced energy and/or power performance in an energy storage device. However, high shear processing is needed to disperse PTFE particles in a manner suitable for forming a self-supporting, processable dry electrode film. Thus, improved processing methods for dry electrode films are needed.

The materials and methods provided herein address the issues noted above. The processes provided herein generally proceed by a parallel process including at least two steps. First, a binder mixture is prepared. The binder mixture generally includes a first binder suitable for providing structure to a dry processed electrode film, and a material suitable for adhering to the first binder. The first binder may be a fibrillizable binder, and may comprise PTFE. The material suitable for adhering to the first binder may be an active electrode material. The components of the first binder mixture are first combined and mixed through a lower shear, nondestructive process, as described herein, and then subjected to a higher shear process, such as milling. Second, a bulk active material mixture is prepared. The active material mixture generally includes the bulk active materials that, upon processing and fabrication, will comprise the electrode film. The active material mixture may include at least one active material, and optionally one or more binders. Finally, the binder mixture may be combined with the active material mixture. The binder mixture and bulk active material mixtures may be mixed in a nondestructive process to form an electrode film mixture. The active material in the binder mixture and the active material in the bulk active material may be the same. Optionally, an electrode film can then be formed from the electrode film mixture, for example, by pressing or calendering. Advantageously, the use of an active material-binder parallel process may improve the characteristics of the final electrode film by only subjecting a small percentage of the overall active material through damaging high shear and/or high pressure mixing procedures.

Unexpectedly, it was discovered that the parallel processing methods provided herein may more efficiently utilize the binder available. Thus, some electrode films fabricated as described herein were stronger than those fabricated using typical dry electrode methods. Without wishing to be limited by theory, it is thought that the fibrillizable binder may achieve better dispersion in a parallel process as described herein. Also surprisingly, some electrodes fabricated using the materials and methods provided herein displayed significantly improved performance.

The parallel processes and electrode film forming processes are compatible with dry electrode fabrication technology. In some embodiments, no solvents are used in any stage of the parallel process nor in the electrode film fabrication.

The present disclosure allows nondestructively processed active materials, for example undamaged and/or pristine surfaces of active material particulates, to be incorporated into an electrode film mixture. Undamaged and/or pristine active materials may include materials with substantially similar surface area distributions, surface chemical reactivates and/or surface chemical compositions to the materials as purchased commercially and/or prior to a process that might alter these physical characteristics of active materials. Thus, reduced surface degradation bulk active material(s) are provided.

Polymer binders, and in particular fluorinated polymer binders such as polytetrafluoroethylene (PTFE), are binders commonly used in electrodes. Some such binders can undergo fibrillization and enable the manufacturing of self-standing films without the aid of a solvent. Manufacturing such films requires physical processing of the bulk binder to create fine particles, which can undergo fibrillization to create a matrix suitable for providing structure to the electrode film. Typically, this binder processing has been performed by a milling or blending operation at high pressure and under high shear forces, and in the presence of the electrode active material(s) to form an electrode film mixture. The forces applied in processing the binder may alter the form of the active material(s), and may damage the surface of the active material(s). For example, the particles of active material(s) may break, fuse, strip, or be chemically altered during such processing.

Such active materials as incorporated in energy storage device electrodes may have coated and/or treated surfaces. For example, carbon materials, and in particular graphitic carbon, may be coated with amorphous carbon. Alternatively or in addition, graphitic carbon may be surface treated to reduce functional groups, and specifically hydrogen-containing functional groups, nitrogen-containing functional groups, and/or oxygen-containing functional groups. Without wishing to be limited by theory, it is thought that the composition of the active material surface affects degradation processes within the energy storage device, e.g., of the electrolyte and impurities therein, and also affects formation of a surface-electrolyte interphase (SEI) layer. Surface-treated active materials may exhibit better performance in an energy storage device electrode compared to active material(s) having untreated surfaces. Better performance may be due to, for example, reduced fissure formation and/or cracking, reduced separation of active material(s)

from a current collector, reduced decomposition of the electrolyte, and/or reduced gassing.

As noted above, processing of a mixture of binder and active material(s) may break the particles of active material(s), and this may expose new, uncoated and/or untreated surfaces of the active material(s). The newly exposed surfaces of the active material(s) may exhibit unfavorable surface characteristics that lead to degradation processes. Thus, the overall performance of the device may be reduced compared to a device incorporating coated and/or surface treated, for example, pristine, active material(s). Thus, disclosed herein in some embodiments are materials and methods providing active material(s) incurring reduced surface damage during fabrication. Further disclosed herein in some embodiments are nondestructive methods for dry electrode fabrication. Certain embodiments of energy storage devices provided herein may provide reduced surface damage graphitic carbon following processing. In particular, self-supporting electrode films including reduced damage active material(s) are provided.

Advantageously, and unexpectedly, it has been discovered that electrode films formed using parallel processes as described herein may tolerate lower binder loading than those formed using typical dry electrode film forming processes. Without wishing to be limited by theory, it is thought that the use of a parallel process as described herein may better disperse the polymer binder compared to a typical dry electrode process. Thus, in some embodiments, a binder matrix sufficient to provide a self-supporting electrode film can be provided with lower overall binder loading compared to a typical dry electrode process.

An electrode film formed using a parallel process as described herein may advantageously exhibit improved performance relative to one formed using typical dry electrode film forming processes. In particular, the first cycle efficiency of a lithium ion battery including at least one electrode prepared using a parallel process as provided herein may be improved. For example, first cycle columbic efficiency during electrochemical cycling may be improved. Without wishing to be limited by theory, it is believed that the improvement can be attributed to the reduced surface damage in the bulk active material, and in appropriate circumstances to reduced binder loading. In some embodiments, an electrode film includes reduced binder loading compared to one fabricated using a typical dry electrode process, while mechanical strength of the electrode film is maintained.

The materials and methods provided herein can be implemented in various energy storage devices. As provided herein, an energy storage device can be a capacitor, a lithium ion capacitor (LIC), an ultracapacitor, a battery, or a hybrid energy storage device and/or a hybrid cell, combining aspects of two or more of the foregoing. In some embodiments, the device is a battery. The energy storage device can be characterized by an operating voltage. In some embodiments, an energy storage device described herein can have an operating voltage of about 0 V to about 4.5 V. In further embodiments, the operating voltage can be about 2.7 V to about 4.2 V, about 3.0 to about 4.2 V, or any values therebetween.

An energy storage device as provided herein includes one or more electrodes. An electrode generally includes an electrode film and a current collector. The electrode film can be formed from a mixture of one or more binders and one or more active electrode material(s). It will be understood that a parallel processed electrode binder, and an electrode including a parallel processed binder provided herein, can be used in various embodiments with any of a number of energy storage devices and systems, such as one or more batteries, capacitors, capacitor-battery hybrids, fuel cells, or other energy storage systems or devices, and combinations thereof. In some embodiments, an electrode film mixture, and an electrode fabricating from an electrode film mixture described herein may be a component of a lithium ion capacitor, a lithium ion battery, an ultracapacitor, or a hybrid energy storage device combining aspects of two or more of the foregoing.

An energy storage device as provided herein can be of any suitable configuration, for example planar, spirally wound, button shaped, or pouch. An energy storage device as provided herein can be a component of a system, for example, a power generation system, an uninterruptible power source systems (UPS), a photo voltaic power generation system, an energy recovery system for use in, for example, industrial machinery and/or transportation. An energy storage device as provided herein may be used to power various electronic device and/or motor vehicles, including hybrid electric vehicles (HEV), plug-in hybrid electric vehicles (PHEV), and/or electric vehicles (EV).

An energy storage device described herein may advantageously be characterized by reduced rise in equivalent series resistance over the life of the device, which may provide a device with increased power density over the life of the device. In some embodiments, energy storage devices described herein may be characterized by reduced loss of capacity over the life of the device. Further improvements that may be realized in various embodiments include improved cycling performance, including improved storage stability during cycling, and reduced capacity fade.

FIG. 1 shows a side cross-sectional schematic view of an example of an energy storage device 100 fabricated using an electrode film parallel process described herein. The energy storage device 100 may be classified as, for example, a capacitor, a battery, a capacitor-battery hybrid, or a fuel cell.

The device can have a first electrode 102, a second electrode 104, and a separator 106 positioned between the first electrode 102 and second electrode 104. The first electrode 102 and the second electrode 104 may be placed adjacent to respective opposing surfaces of the separator 106. The energy storage device 100 may include an electrolyte 118 to facilitate ionic communication between the electrodes 102, 104 of the energy storage device 100. For example, the electrolyte 118 may be in contact with the first electrode 102, the second electrode 104 and the separator 106. The electrolyte 118, the first electrode 102, the second electrode 104, and the separator 106 may be received within an energy storage device housing 120. One or more of the first electrode 102, the second electrode 104, and the separator 106, or constituent thereof, may comprise porous material. The pores within the porous material can provide containment for and/or increased surface area for reactivity with an electrolyte 118 within the housing 120. The energy storage device housing 120 may be sealed around the first electrode 102, the second electrode 104 and the separator 106, and may be physically sealed from the surrounding environment.

In some embodiments, the first electrode 102 can be an anode (the "negative electrode") and the second electrode 104 can be the cathode (the "positive electrode"). The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a suitable porous, electrically insulating material. In some embodiments, the separator 106 can comprise a polymeric material. For example, the separator 106 can comprise a cellulosic material (e.g., paper), a polyethylene (PE) material, a polypropylene (PP) material, and/or a polyethylene and polypropylene material.

Generally, the first electrode 102 and second electrode 104 each comprise a current collector and an electrode film. Electrodes 102 and 104 comprise electrode films 112 and 114, respectively. Electrode films 112 and 114 can have any suitable shape, size and thickness. For example, the electrode films can have a thickness of about 30 microns (μm) to about 250 microns, for example, about 50 microns, about 100 microns, about 150 microns, about 200 microns, about 250 microns, or any range of values therebetween, or other thicknesses. The electrode films can comprise one or more parallel-processed binder materials. In some embodiments, electrode films 112 and 114, can include parallel-processed binder mixtures comprising binder material and an active material. In some embodiments, the active material can be a carbon based material or a battery material. In some embodiments, an active material can include a lithium metal oxide, sulfur carbon composite and/or a lithium sulfide. In some embodiments, active material may include lithium nickel manganese cobalt oxide (NMC), lithium manganese oxide (LMO), lithium iron phosphate (LFP), lithium cobalt oxide (LCO), lithium titanate (LTO), and/or lithium nickel cobalt aluminum oxide (NCA). In some embodiments, the active material may include other material described herein.

The at least one active material may include one or more carbon materials. The carbon materials may be selected from, for example, graphitic material, graphite, graphene-containing materials, hard carbon, soft carbon, carbon nanotubes, porous carbon, conductive carbon, or a combination thereof. Activated carbon can be derived from a steam process or an acid/etching process. In some embodiments, the graphitic material can be a surface treated material. In some embodiments, the porous carbon can comprise activated carbon. In some embodiments, the porous carbon can comprise hierarchically structured carbon. In some embodiments, the porous carbon can include structured carbon nanotubes, structured carbon nanowires and/or structured carbon nanosheets. In some embodiments, the porous carbon can include graphene sheets. In some embodiments, the porous carbon can be a surface treated carbon. In preferred embodiments, the active material comprises, consists essentially of, or consists of graphite.

The first electrode film 112 and/or the second electrode film 114 may also include parallel-processed binders as provided herein. In some embodiments, the binder can include one or more polymers. In some embodiments, the binder can include one or more fibrillizable binder components. The binder component may be fibrillized to provide a plurality of fibrils, the fibrils desired mechanical support for one or more other components of the film. It is thought that a matrix, lattice, or web of fibrils can be formed to provide mechanical structure to the electrode film. In some embodiments, a binder component can include one or more of a variety of suitable fibrillizable polymeric materials.

Generally, the electrode films described herein can be fabricated using a modified dry fabrication process. For example, some steps provided herein may be as described in U.S. Patent Publication No. 2005/0266298 and U.S. Patent Publication No. 2006/0146479. These, and any other references to extrinsic documents herein, are hereby incorporated by reference in their entirety. As used herein, a dry fabrication process can refer to a process in which no or substantially no solvents are used in the formation of an electrode film. For example, components of the electrode film, including carbon materials and binders, may comprise dry particles. The dry particles for forming the electrode film may be combined to provide a dry particle electrode film mixture. In some embodiments, the electrode film may be formed from the dry particle electrode film mixture such that weight percentages of the components of the electrode film and weight percentages of the components of the dry particles electrode film mixture are substantially the same. In some embodiments, the electrode film formed from the dry particle electrode film mixture using the dry fabrication process may be free from, or substantially free from, any processing additives such as solvents and solvent residues resulting therefrom. In some embodiments, the resulting electrode films are self-supporting electrode films formed using the dry process from the dry particle mixture. In some embodiments, the resulting electrode films are free-standing electrode films formed using the dry process from the dry particle mixture. A process for forming an electrode film can include fibrillizing the fibrillizable binder component(s) such that the electrode film comprises fibrillized binder. In further embodiments, a free-standing electrode film may be formed in the absence of a current collector. In still further embodiments, an electrode film may comprise a fibrillized polymer matrix such that the electrode film is self-supporting.

As shown in FIG. 1, the first electrode 102 and the second electrode 104 include a first current collector 108 in contact with first electrode film 112, and a second current collector 110 in contact with the second electrode film 114, respectively. The first current collector 108 and the second current collector 110 may facilitate electrical coupling between each corresponding electrode film and an external electrical circuit (not shown). The first current collector 108 and/or the second current collector 110 can comprise one or more electrically conductive materials, and have any suitable shape and size selected to facilitate transfer of electrical charge between the corresponding electrode and an external circuit. For example, a current collector can include a metallic material, such as a material comprising aluminum, nickel, copper, rhenium, niobium, tantalum, and noble metals such as silver, gold, platinum, palladium, rhodium, osmium, iridium and alloys and combinations of the foregoing. For example, the first current collector 108 and/or the second current collector 110 can comprise an aluminum foil. The aluminum foil can have a rectangular or substantially rectangular shape sized to provide transfer of electrical charge between the corresponding electrode and an external electrical circuit.

In some embodiments, the energy storage device 100 is a lithium ion battery or hybrid energy storage device including a cathode comprising an active material. In some embodiments, the lithium ion battery is configured to operate at about 2.5 to 4.5 V, or 2.7 to 4.2 V.

In some embodiments, an energy storage device is configured to operate at 3 volts or greater. In further embodiments, an energy storage device is configured to operate at 2.7 volts or greater. In some embodiments, an energy storage device is configured for operation at selected conditions of voltage and temperature. For example, an energy storage device can be configured for operation at 50° C., 55° C., 60° C., 65° C., 70° C., 75° C., 80° C., 85° C., 90° C., 95° C., 100° C., or greater temperatures, or any range of values therebetween. An energy storage device can be configured for continual operation at 2.7 V at 60 to 85° C., 2.8 V at 60 to 85° C., 2.9 V at 60 to 85° C., or 3 V at 60 to 85° C., or any selected temperature values therebetween. In some embodiments, the conditions of voltage and temperature are about 2.7 V and about 85° C., about 2.8 V and about 80° C., about 2.9 V and about 75° C., about 3 V and about 70° C., or about 3.1 V and about 65° C.

In some embodiments, secondary electrochemical reactions of the electrode and/or electrolyte components are reduced in energy storage devices fabricated using a parallel process as described herein.

Technologies described herein may be used separately or in combination in an energy storage device to enable operation under the selected conditions.

Lithium Ion Energy Storage Device

In some embodiments, energy storage device 100 can be a lithium ion energy storage device such as a lithium ion capacitor, a lithium ion battery, or a hybrid lithium ion device. In some embodiments, an electrode film of a lithium ion energy storage device electrode can comprise one or more active materials, and a fibrillized binder matrix as provided herein. An electrode film may be fabricated by a parallel processing method described herein.

In some embodiments, an electrode film of a lithium ion energy storage device can comprise an anode active material. Anode active materials can comprise, for example, an insertion material (such as carbon, graphite, and/or graphene), an alloying/dealloying material (such as silicon, silicon oxide, tin, and/or tin oxide), a metal alloy or compound (such as Si—Al, and/or Si—Sn), and/or a conversion material (such as manganese oxide, molybdenum oxide, nickel oxide, and/or copper oxide). The anode active materials can be used alone or mixed together to form multiphase materials (such as Si—C, Sn—C, SiOx-C, SnOx-C, Si—Sn, Si-SiOx, Sn-SnOx, Si-SiOx-C, Sn-SnOx-C, Si—Sn—C, SiOx-SnOx-C, Si-SiOx-Sn, or Sn-SiOx-SnOx).

In some embodiments, an electrode film of a lithium ion energy storage device can comprise active cathode material. In some embodiments, the electrode film may further comprise a binder, and optionally a porous carbon material, and optionally a conductive additive. In some embodiments, the conductive additive may comprise a conductive carbon additive, such as carbon black. In some embodiments, the porous carbon material may comprise activated carbon. In some embodiments, the cathode active material can include a lithium metal oxide and/or a lithium sulfide. In some embodiments, the cathode active material may include lithium nickel manganese cobalt oxide (NMC), lithium manganese oxide (LMO), lithium iron phosphate (LFP), lithium cobalt oxide (LCO), lithium titanate (LTO), and/or lithium nickel cobalt aluminum oxide (NCA). The cathode active material can comprise sulfur or a material including sulfur, such as lithium sulfide ($Li_2S$), or other sulfur-based materials, or a mixture thereof. In some embodiments, the cathode film comprises a sulfur or a material including sulfur active material at a concentration of at least 50 wt %. In some embodiments, the cathode film comprising a sulfur or a material including sulfur active material has an areal capacity of at least 10 mAh/cm². In some embodiments, the cathode film comprising a sulfur or a material including sulfur active material has an electrode film density of 1 g/cm³. In some embodiments, the cathode film comprising a sulfur or a material including sulfur active material further comprises a binder. In some embodiments, the binder of the cathode film comprising a sulfur or a material including sulfur active material is selected from polytetrafluoroethylene (PTFE), polyvinylidene fluoride (PVDF), poly(ethylene oxide) (PEO), polyethylene (PE), polyacrylic acid (PAA), gelatin, other thermoplastics, or any combination thereof.

In some embodiments, a cathode electrode film of a lithium ion battery or hybrid energy storage device can include about 70 weight % to about 98 weight % of the active material, including about 70 weight % to about 96 weight %, or about 70 weight % to about 88 weight %. In some embodiments, the cathode electrode film can comprise up to about 10 weight % of the porous carbon material, including up to about 5 weight %, or about 1 weight % to about 5 weight %. In some embodiments, the cathode electrode film comprises up to about 5 weight %, including about 1 weight % to about 3 weight %, of the conductive additive. In some embodiments, the cathode electrode film comprises up to about 20 weight % of the binder, for example, about 1.5 weight % to 10 weight %, about 1.5 weight % to 5 weight %, or about 1.5 weight % to 3 weight %. In some embodiments, the cathode electrode film comprises about 1.5 weight % to about 3 weight % binder.

In some embodiments, an anode electrode film may comprise an active material, a binder, and optionally a conductive additive. In some embodiments, the conductive additive may comprise a conductive carbon additive, such as carbon black. In some embodiments, the active material of the anode may comprise a graphitic carbon, synthetic graphite, natural graphite, hard carbon, soft carbon, graphene, mesoporous carbon, silicon, silicon oxides, tin, tin oxides, germanium, lithium titanate, mixtures, or composites of the aforementioned materials. In some embodiments, an anode electrode film can include about 80 weight % to about 98 weight % of the active material, including about 90 weight % to about 98 weight %, or about 94 weight % to about 97 weight %. In some embodiments, the anode electrode film comprises up to about 5 weight %, including about 1 weight % to about 3 weight %, of the conductive additive. In some embodiments, the anode electrode film comprises up to about 20 weight % of the binder, including about 1.5 weight % to 10 weight %, about 1.5 weight % to 5 weight %, or about 3 weight % to 5 weight %. In some embodiments, the anode electrode film comprises about 4 weight % binder. In some embodiments, the anode film may not include a conductive additive.

In some embodiments, the electrode film of a lithium ion energy storage device electrode comprises an electrode film mixture comprising carbon configured to reversibly intercalate lithium ions. In some embodiments, the lithium intercalating carbon is selected from a graphitic carbon, graphite, hard carbon, soft carbon and combinations thereof. For example, the electrode film of the electrode can include a binder material, one or more of graphitic carbon, graphite, graphene-containing carbon, hard carbon and soft carbon, and an electrical conductivity promoting material. In some embodiments, an electrode is mixed with lithium metal and/or lithium ions.

Some embodiments include an electrode, such as an anode and/or a cathode, having one or more electrode films comprising a polymeric binder material. The polymeric binder material may be a parallel processed binder as provided herein. In some embodiments, the binder may comprise PTFE and optionally one or more additional binder components. In some embodiments, the binder may comprise one or more polyolefins and/or co-polymers thereof, and PTFE. In some embodiments, the binder may comprise a PTFE and one or more of a cellulose, a polyolefin, a polyether, a precursor of polyether, a polysiloxane, co-polymers thereof, and/or admixtures thereof. In some embodiments, the binder can include branched polyethers, polyvinylethers, co-polymers thereof, and/or the like. The binder can include co-polymers of polysiloxanes and polysiloxane, and/or co-polymers of polyether precursors. For example, the binder can include poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In some embodiments, the one or more polyolefins can include polyethylene (PE), polypropylene (PP), polyvinylidene fluoride (PVDF), co-polymers thereof, and/or mixtures thereof. The binder can include a cellulose, for example, carboxymethylcellulose (CMC). An admixture of polymers may comprise interpenetrating networks of the aforementioned polymers or co-polymers. The binder may include a parallel processed binder as provided herein.

The binder may include various suitable ratios of the polymeric components. For example, PTFE can be up to about 100 weight % of the binder, for example, from about 20 weight % to about 95 weight %, about 20 weight % to about 90 weight %, including about 20 weight % to about 80 weight %, about 30 weight % to about 70 weight %, or about 30 weight % to about 50 weight %. In further embodiments, the binders can comprise PTFE, CMC, and PVDF as binders. In certain embodiments, the electrode film can comprise 2 weight % PTFE, 1 weight % CMC, and 1 weight % PVDF. For example, the binder mixture can include a mass of PTFE which is 50% of the total binder content of the electrode film, and 2% of the total mass of the electrode film.

In further embodiments, the energy storage device 100 is charged with a suitable lithium-containing electrolyte. For example, device 100 can include a lithium salt, and a solvent, such as a non-aqueous or organic solvent. Generally, the lithium salt includes an anion that is redox stable. In some embodiments, the anion can be monovalent. In some embodiments, a lithium salt can be selected from hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), and combinations thereof. In some embodiments, the electrolyte can include a quaternary ammonium cation and an anion selected from the group consisting of hexafluorophosphate, tetrafluoroborate and iodide. In some embodiments, the salt concentration can be about 0.1 mol/L (M) to about 5 M, about 0.2 M to about 3 M, or about 0.3 M to about 2 M. In further embodiments, the salt concentration of the electrolyte can be about 0.7 M to about 1 M. In certain embodiments, the salt concentration of the electrolyte can be about 0.2 M, about 0.3 M, about 0.4 M, about 0.5 M, about 0.6 M, about 0.7 M, about 0.8 M. about 0.9 M, about 1 M, about 1.1 M, about 1.2 M, or values therebetween.

In some embodiments, an energy storage device provided herein can include a liquid solvent. A solvent as provided herein need not dissolve every component, and need not completely dissolve any component, of the electrolyte. In further embodiments, the solvent can be an organic solvent. In some embodiments, a solvent can include one or more functional groups selected from carbonates, ethers and/or esters. In some embodiments, the solvent can comprise a carbonate. In further embodiments, the carbonate can be selected from cyclic carbonates such as, for example, ethylene carbonate (EC), propylene carbonate (PC), vinyl ethylene carbonate (VEC), vinylene carbonate (VC), fluoroethylene carbonate (FEC), and combinations thereof, or acyclic carbonates such as, for example, dimethyl carbonate (DMC), diethyl carbonate (DEC), ethyl methyl carbonate (EMC), and combinations thereof. In certain embodiments, the electrolyte can comprise $LiPF_6$, and one or more carbonates.

In some embodiments, the active material includes a treated carbon material, where the treated carbon material includes a reduction in a number of hydrogen-containing functional groups, nitrogen-containing functional groups and/or oxygen-containing functional groups, as described in U.S. Patent Publication No. 2014/0098464. For example, the treated carbon particles can include a reduction in a number of one or more functional groups on one or more surfaces of the treated carbon, for example about 10% to about 60% reduction in one or more functional groups compared to an untreated carbon surface, including about 20% to about 50%. The treated carbon can include a reduced number of hydrogen-containing functional groups, nitrogen-containing functional groups, and/or oxygen-containing functional groups. In some embodiments, the treated carbon material comprises functional groups less than about 1% of which contain hydrogen, including less than about 0.5%. In some embodiments, the treated carbon material comprises functional groups less than about 0.5% of which contains nitrogen, including less than about 0.1%. In some embodiments, the treated carbon material comprises functional groups less than about 5% of which contains oxygen, including less than about 3%. In further embodiments, the treated carbon material comprises about 30% fewer hydrogen-containing functional groups than an untreated carbon material.

Electrode Films and Electrode Film Mixtures Fabricated by Parallel Binder Processing Provided herein are compositions and methods for electrode films characterized by reduced surface damage to active materials. Parallel processing of binder and active material advantageously has been found to allow only a subset of active material to be submitted to damaging high shear and/or high pressure processing. Some active material particles having an undamaged and/or pristine surface can be added to and mixed with the binder mixture to form an electrode film mixture. Thus, at least a portion of the active material in the electrode film mixture may have favorable surface characteristics, and the bulk electrode film formed therefrom may exhibit improved performance. Additionally, it was found that some electrode films formed using parallel processing methods as provided herein enjoyed unexpected advantages in efficiency and/or film strength.

Generally, a binder mixture is prepared by mixing a binder material with a portion of the active material(s) constituting the electrode film mixture to form a binder mixture. Generally, the mixing of active material and binder can be by a method provided herein, or by any suitable method. The mixing may be by a nondestructive process. The nondestructive mixing may comprise blending, tumbling, or acoustic mixing. It was found that acoustic mixing generally provided the most efficient mixing with the least damage to the active material particles.

The active material and binder can be processed by a high shear and/or high pressure process to form a binder mixture. The high shear and/or high pressure process may include jet-milling or blending. The processing time and/or feed rate generally will have an effect on the final particle size of the binder and/or active material(s). For example, a longer time and/or slower feed rate may produce smaller particles. Without wishing to be limited by theory, it is thought that smaller particle sizes correspond with more damaged particles, and vice versa. The binder mixture can be combined with additional active material(s) and/or binders to form an electrode film mixture suitable for processing, and in particular calendaring, into an electrode film. In some embodiments, the electrode film so formed is a self-supporting electrode film.

In various embodiments, the resulting contact between the active material and the binder in the binder mixture can be described as sticking or clinging. The contact between active material and binder particle in the binder mixture may be due to for example, intermolecular interactions such as ionic forces, polar interactions, induced dipole interactions, London dispersion forces, and/or surface forces. The active material particles may adhere to the PTFE particles such that agglomerations are formed. Some binder particles may be completely encased within such agglomerations. In some embodiments, the weight percent portion of active material(s) in the binder mixture may be about, at least about, or at most about, 1%, 2%, 3%, 4%, 5%, 10%, 15%, or 20% of the total active material in the electrode film mixture or electrode film, or any range of values therebetween. In some embodiments, the weight percent portion of one or more binder materials in the binder mixture may be about, at least about, or at most about, 100%, 99%, 98%, 95%, 90%, 80%, 70%, 60%, 50% or 40% of the total binder in the electrode film mixture or electrode film, or any range of values therebetween.

The active material(s) combined with binder for processing into a binder mixture may generally be any active material(s) suitable for including in an electrode film. The active material(s) may include, for example, a carbon material as provided herein. The carbon material may be, for example, graphitic carbon, graphite, graphene-containing materials, activated carbon, hard carbon, soft carbon, and/or carbon nanotubes. The active material(s) may include a battery active material(s) as provided herein. In a preferable embodiment, the active material is graphite.

Generally, the binder combined with active material(s) in the parallel process may be a binder suitable for providing structure to an electrode film produced by dry electrode fabrication. In some embodiments, the binder is PTFE and optionally one or more additional binder components. In further embodiments, the binder includes PTFE and a polyolefin, poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In some embodiments, the one or more polyolefins can include polyethylene (PE), polypropylene (PP), polyvinylidene fluoride (PVDF), co-polymers thereof, and/or mixtures thereof. The binder can include a cellulose, for example, carboxymethylcellulose (CMC). In certain embodiments, the binder comprises, consists essentially, or consists of PTFE, PVCF, and CMC. In some embodiments, the binder comprises a fibrillizable polymer.

In some embodiments, the binder mixture may include binder particles having selected sizes. In some embodiments, the binder particles in a binder mixture may be about 50 nm, about 100 nm, about 150 nm, about 200 nm, about 250 nm, about 300 nm, about 350 nm, about 400 nm, about 450 nm, about 500 nm, about 1 µm, about 10 µm, about 50 µm, about 100 µm, or values therebetween. In some embodiments, the binder mixture may include active material particles having selected sizes. In some embodiments, the active material particles in a binder mixture may on average have a longest dimension of about 4 µm, about 5 µm, about 6 µm, about 7 µm, about 8 µm, about 9 µm, about 10 µm, about 12 µm, about 14 µm, about 16 µm, about 18 µm, about 20 µm, about 25 µm, or any range of values therebetween. The active material particles may comprise graphite.

The proportions of the first binder material and active material combined in the binder mixture can be selected based on any number of factors including the identities of the binder and active material components, particle sizes, planned processing steps, the desired material properties of the electrode film such as strength and flexibility, and the desired performance characteristics of the electrode, for example, of power and/or energy. For example, the mass ratio of active material(s) to first binder can be about 1:1, about 1.5:1, about 2:1, about 3:1, about 4:1, about 5:1, about 6:1, about 8:1, about 10:1, or values therebetween. In preferred embodiments, the mass ratio of active material(s) to first binder can be about 2:1 to about 4:1. The binder mixture may have the same selected mass ratios of active material(s) to first binder. Generally, the amount of active material in the bulk active material mixture may be determined from the amount of active material included for processing with the structural binder in the parallel binder processing, taking into account the total amount of active material to be included in the final electrode film mixture. In some embodiments, the binder mixture is processed in the absence of processing additives.

Advantageously, an electrode film prepared using a parallel processing method described herein may be characterized by a greater strength than an electrode film having the same composition, but prepared by conventional dry electrode techniques. In further embodiments, an electrode film fabricated using the materials and methods disclosed herein can be characterized by reduced binder loading compared to a typical dry electrode film. In various embodiments, the electrode film mixture, and/or electrode film, can have a PTFE loading of at most 1%, 1.5%, 2%, 2.5%, 3%, 3.5%, 4%, 4.5%, or 5% by mass, or any range of values therebetween. In certain embodiments, the PTFE loading is about 1.5 to about 3%. In further embodiments, the electrode film mixture, and/or electrode film, can have a total binder loading of at most 1%, 1.5%, 2%, 2.5%, 3%, 3.5%, 4%, 4.5%, 5%, 5.5%, or 6% by mass, or any range of values therebetween. In certain embodiments, the total binder loading is about 1.5 to about 4%. In further embodiments, an electrode film prepared by the materials and methods described herein may withstand certain tensile forces. For example, an electrode film may incur a tensile force on breaking of about, or greater than about, 0.75 Newton (N), about 0.8 N, about 0.9 N, about 1 N, about 1.1 N, about 1.2 N, about 1.3 N, about 1.4 N, about 1.5 N, about 1.6 N, about 1.7 N, about 1.8 N, about 1.9 N or about 2 N, or any range of values therebetween. In further embodiments, an electrode film prepared by the materials and methods described herein, may have certain tensile strengths. For example, an electrode film may have a tensile strength of about, or greater than about, 0.25 MPa, about 0.3 MPa, about 0.35 MPa, about 0.4 MPa, about 0.45 MPa, about 0.5 MPa, about 0.55 MPa, about 0.6 MPa, about 0.65 MPa or about 0.7 MPa, or any range of values therebetween. In some embodiments, the electrode film mixture and/or free-standing electrode film has a $D_{50}$ particle size distribution of total active material of about, greater than about, or at least about, 6 µm, 6.5 µm, 7 µm, 7.5 µm, 8 µm, 8.5 µm, 9 µm, 9.5 µm or 10 µm, or any range of values therebetween.

In preferred embodiments, the parallel process comprises combining an active material comprising, consisting essentially, or consisting of graphite, and a binder comprising, consisting essentially, or consisting of PTFE to form a binder mixture. In preferred embodiments, a ratio of 1:1 to 4:1 of graphite to PTFE by weight is used. The mixture of graphite and PTFE can be combined together first by selecting a mixing technique that will effectively mix and disperse the two components without damaging the active material(s), for example, the graphite particles. In certain embodiments, an electrode fabricated by the processes disclosed herein comprises a self-supporting negative electrode film (anode), although positive electrode films (cathodes) are anticipated. The processes herein may be beneficial towards implementation with a negative electrode, because negative electrode active materials may be more susceptible to surface changes during processing.

In some embodiments, the electrode film mixture is subjected to one or more dry electrode process(es), such as that described in U.S. Patent Publication No. 2015/0072234. In some embodiments, a dry electrode is provided, wherein the dry electrode is free from processing contaminants such as solvents, and wherein the dry electrode is prepared by the methods and materials provided herein.

In further embodiments, an electrode fabricated using the materials and methods disclosed herein can be characterized by improved performance. The improved performance may be due to, for example, increased first cycle efficiency. In some embodiments, the first cycle efficiency of a negative electrode fabricated by the materials and methods provided herein is more than or at least about 85%. In further embodiments, the first cycle efficiency is about, at least about, or more than about, 85%, about 86%, about 87%, about 88%, about 89% about 90%, about 91%, about 92%, about 93%, or any range of values therebetween, and may be, for example, within a range of about 86 to about 93%.

In some embodiments, degradation of PTFE is not an observed failure mode of an energy storage device including an electrode fabricated using the materials and methods provided herein.

In some embodiments, a method for fabricating an energy storage device is provided. In further embodiments, the method comprises selecting a binder, selecting an active material, parallel processing the binder and active material to form a binder mixture, and combining the binder mixture with additional active materials and optionally with additional binders to form an electrode film mixture, optionally fibrillating the electrode film mixture to form an electrode film, and optionally applying the electrode film to a current collector to form an electrode.

Figure 2:
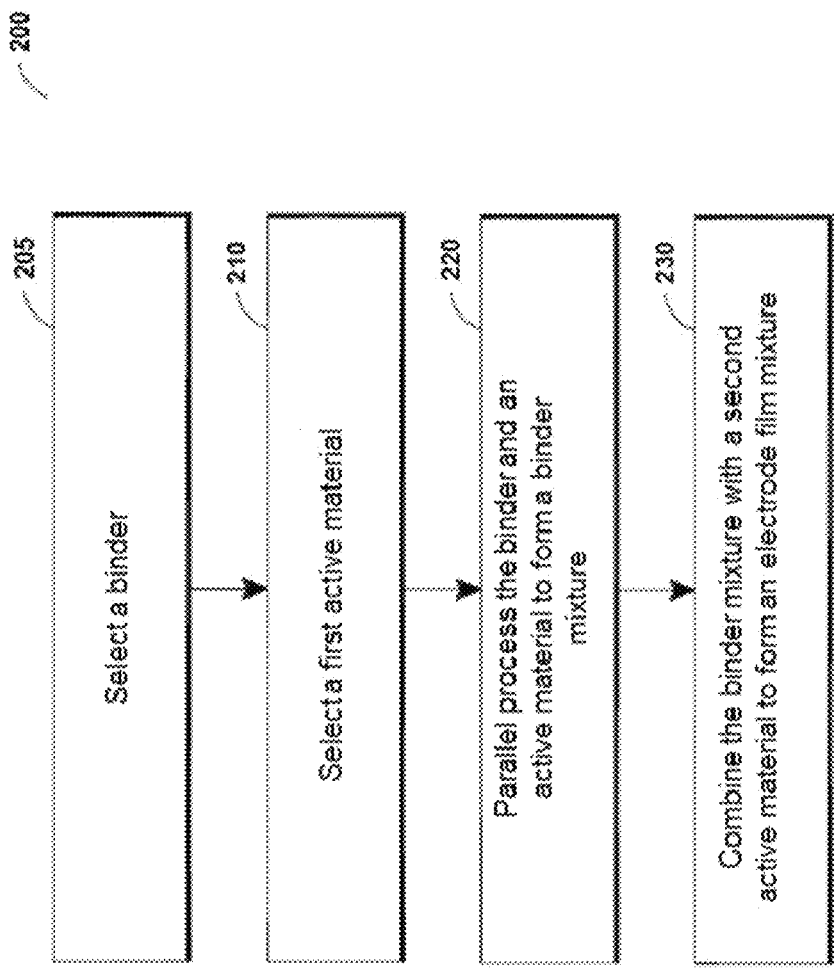
FIG. 2 provides a flow chart for parallel preparation of electrode film mixtures.

FIG. 2 depicts an embodiment of a method 200 for preparing an electrode film mixture for use in an energy storage device. In step 205 a suitable binder is selected. The binder selected may be a binder as provided herein. In some embodiments, the binder selected is a single binder. In some embodiments, the binder is dry. In some embodiments, the binder is in powder form. In some embodiments, the binder selected is a fibrillizable binder, wherein the fibrillizable binder is as provided herein. In preferred embodiments, the binder selected is PTFE. In certain embodiments, the binder comprises, consists of, or consists essentially of PTFE or any one of the aforementioned binder materials.

In step 210, a suitable first active material is selected. Generally, the active material is any active material that may be included in an electrode film of an energy storage device, such as those provided herein. In some embodiments, the active material can comprise a carbon material as provided herein. In further embodiments, the active material can be a battery active material, such as a metal oxide or metal sulfide. In preferred embodiments, the active material can comprise, consist essentially of, or consist of a graphitic carbon.

In step 220, the first active material selected in step 210 and binder material selected in step 205 are parallel processed to form a binder mixture. The parallel process can be performed by a high shear and/or high pressure process, such as jet milling or blending, to form a binder mixture. The high shear and/or high pressure process may beneficially deagglomerate binder particles. Step 220 can include an initial step of combining the first active material and binder material in a separate step prior to being subjected to the high shear and/or high shear process. For example, the first active material and binder material can be combined by any suitable method or methods, such as a non-destructive process. For example, the first active material and binder material can be combined with an acoustic mixer, such as a Resodyn mixer.

In step 230, the binder mixture is combined with a second active material, and optionally additional binder materials. The second active material and/or the additional binder materials can be the same or different as the first active material and binder. In some embodiments, the combining can be accomplished by a nondestructive process as provided herein. For example, the combining can comprise jet-milling at reduced pressure and/or increased feed rate. For example, the jet-milling can be performed at a pressure of 80 psi, 70 psi, 60 psi, 50 psi, 40 psi, 30 psi, 20 psi, or values therebetween, at a feed rate of 200 g/min, 250 g/min, 300 g/min, 350 g/min, 400 g/min or values therebetween. Step 230 can include an initial step of combining the second active material and binder mixture in a separate step prior to being subjected to the low shear process. For example, the second active material and binder mixture can be combined by any suitable method or methods, such as a non-destructive process. For example, the second active material and binder mixture can be combined with an acoustic mixer, such as a Resodyn mixer. In some embodiments, the additional binders can comprise a binder selected from PTFE, carboxymethylcellulose (CMC), poly(vinylidene fluoride) (PVDF), and combinations thereof. In certain embodiments, the additional binders are CMC and/or PVDF.

Examples

A binder mixture was prepared by mixing graphite and PTFE first, by a nondestructive mixing technique that mixed these two components without damaging the graphite particles. This was achieved by the Resodyn mixer (an acoustic mixer, LabRAM) at 50% power for 5 minutes. Approximately 60 Gs of acceleration was needed to disperse the PTFE particles with the graphite particles. Second, the mixture was then further processed by jet milling at 80 psi grinding pressure and 60 psi feeding pressure with a feed rate of 50 g/min. The resulting powder could be added to other active material(s) and/or binders at appropriate proportions as a source of PTFE binder.

Figure 3:
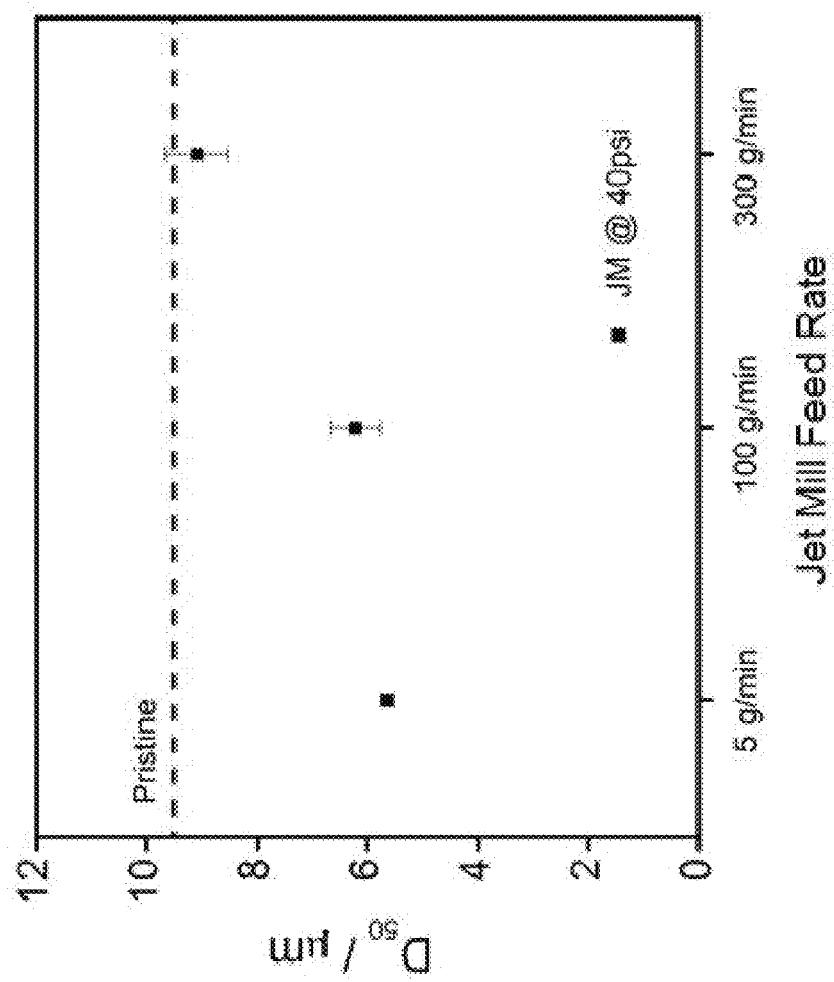
FIG. 3 provides a particle size analysis of graphite particles after being jet milled at 40/40 psi with various feed rates.

The binder mixture was then mixed with graphite, carboxymethyl cellulose, and polyvinylidene fluoride mixtures using a nondestructive Resodyn acoustic mixer process to create a final mixture. In order to reduce the damage on the graphite particles, a fast feed rate of at least 300 g/min was needed in a Sturtevant 2-inch diameter micronizer in order to avoid damage. The feed rate would depend on various factors, but generally a higher feed rate would be expected to correspond with less damage to the graphite particles. FIG. 3 demonstrates the effects of jet mill feed rate and the resulting particle size to the material (smaller particle sizes are believed to correspond to more damaged particles, and vice versa). The resulting powder was then processed through a calender press to produce a free standing film as in typical dry electrode fabrication processes.

Figure 4A:
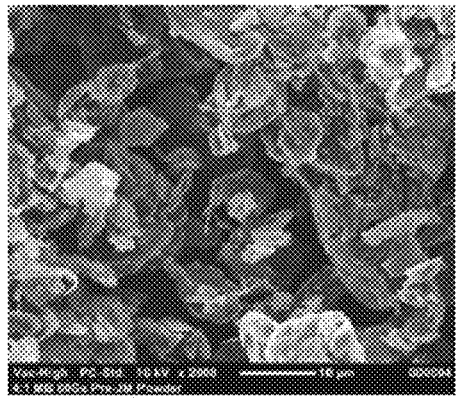
FIGS. 4A-4C depict SEM images of a 4:1 graphite:PTFE binder mixture after Resodyn mixing (FIG. 4A), after jet milling at 80 psi (FIG. 4B), and after calender rolling (FIG. 4C).
Figure 4B:
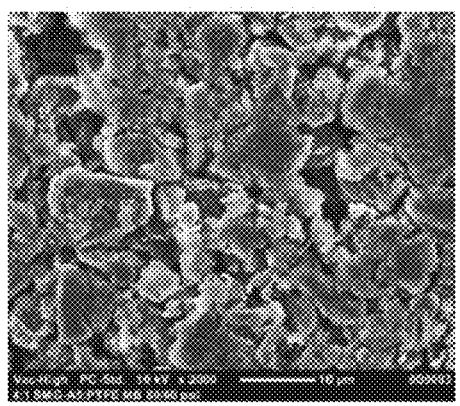
Figure 4C:
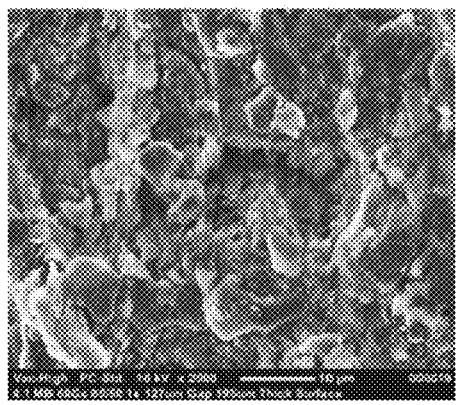

SEM images of a 4:1 Graphite (Hitachi SMG-A5) to PTFE binder mixture at various points of a parallel process is shown in FIG. 4A-4C. The binder mixture after being Resodyned is shown in FIG. 4A. Agglomerated graphite particles can be observed in FIG. 4A. It is believed that the graphite particles adhere to and coat PTFE particles and the mixing energy in the Resodyn mixer was not high enough to break apart these agglomerations. The binder mixture after being jet milled is shown in FIG. 4B. In FIG. 4B, small PTFE particles of ~250 nm in primary particle size can be seen to coat the surface of graphite particles. These PTFE particles bind the graphite particles together. However, little to no fibrillation of the PTFE particles is observed indicating that only dispersion of PTFE can be achieved with mixing processes. When the binder mixture was calender rolled for analytical purposes, the mixture formed a very strong but less flexible self-supporting, free standing film. SEM images of the film surface shown in FIG. 4C revealed complete fibrillation of most of the PTFE particles. Although the binder mixture of FIG. 4C was calender rolled for analysis, generally the binder mixture would be combined with additional active materials and/or binders before being calendered into an electrode film.

A general dry method for preparing a dry electrode, which was implemented in the studies described further below with respect to FIGS. 5-8B and 10, is as follows: an electrode film mixture of graphite powder, PTFE, CMC, PVDF were thoroughly mixed. Mixing was varied between some of the examples as described. In some examples, the mixing was a single step, with high shear mixing only, and in others, mixing was a parallel process that includes both non-destructive and high shear mixing, according to some embodiments. The resulting electrode film mixture was calendered into a free-standing electrode film. Lamination of the electrode film onto a carbon coated copper foil provided a carbon electrode.

A general method for preparing a lithium-based cell, also implemented in the studies described further below, was performed as follows: a polyolefin separator was placed on lithium metal, on which the aforementioned carbon electrode was placed to form an electrode stack. An electrolyte comprising 1 molar (1M) lithium hexafluorophosphate (LiPF6) in a carboxylic ester comprising ethylene carbonate (EC) and ethyl-methyl carbonate (EMC) at a 3:7 ratio, was applied to the electrode stack and the combined electrode stack and electrolyte were sealed to form the lithium-based cell.

Figure 5:
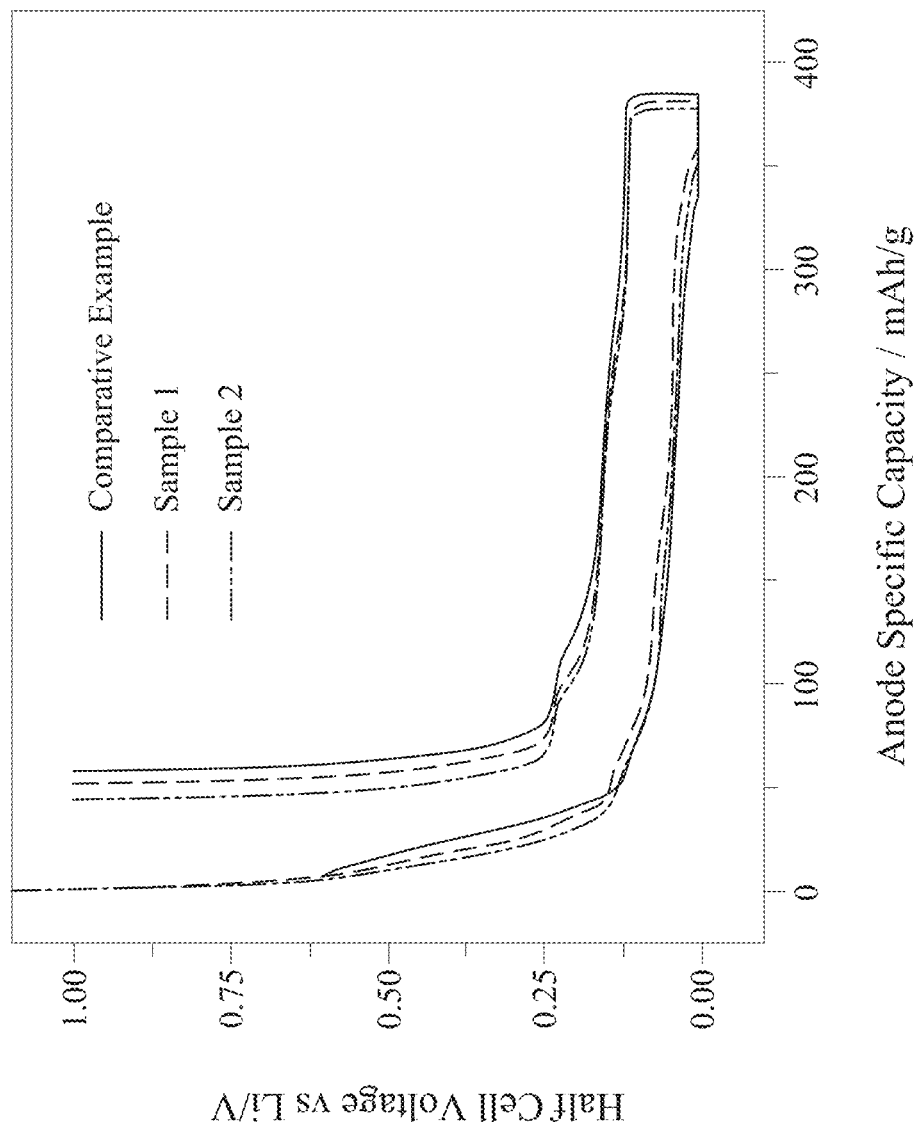
FIG. 5 provides a graph showing the first cycle electrochemical voltage profile for three lithium ion batteries with different electrode fabricated under serial and parallel processing conditions. Efficiencies of the batteries were determined by the change in voltage between the initial lithiation and delithiation curves.

For comparison of various binder mixtures, first cycle electrochemical voltage profiles for three electrode samples, created by the general dry electrode and lithium-based cell methods previously described, were collected as shown in FIG. 5. The final electrode films included 94% graphite powder, 3% PTFE and combined 3% CMC/PVDF loadings in the final electrode film mixtures each case, to allow for direct comparison and to show that the improvement over a typical process was due to the binder processing. The "Comparative Example" sample is a lithium based cell that included a dry electrode prepared according to the above dry electrode and lithium-based cell fabrication technique, wherein the entire electrode film mixture was mixed solely by a high shear process. Sample 1 and Sample 2 are also lithium based cells including a dry electrode prepared according to the above procedures, but wherein the electrode films were fabricated from parallel-process electrode film mixtures by methods provided herein, and wherein a 4:1 graphite-PTFE binder mixture and a 2:1 graphite-PTFE binder mixture, respectively, were mixed under high shear prior to nondestructive mixing with the remaining active material mixture to form the electrode film mixture, and calender rolling the electrode film mixtures at high temperatures of 185° C. to form the free-standing electrode films. As seen in FIG. 5, the "Comparative Example" sample had a first cycle efficiency of only 85.0%, whereas the Sample 1 had a first cycle efficiency of 86.6% and the Sample 2 had the best first cycle efficiency, at 87.8%.

Figure 6:
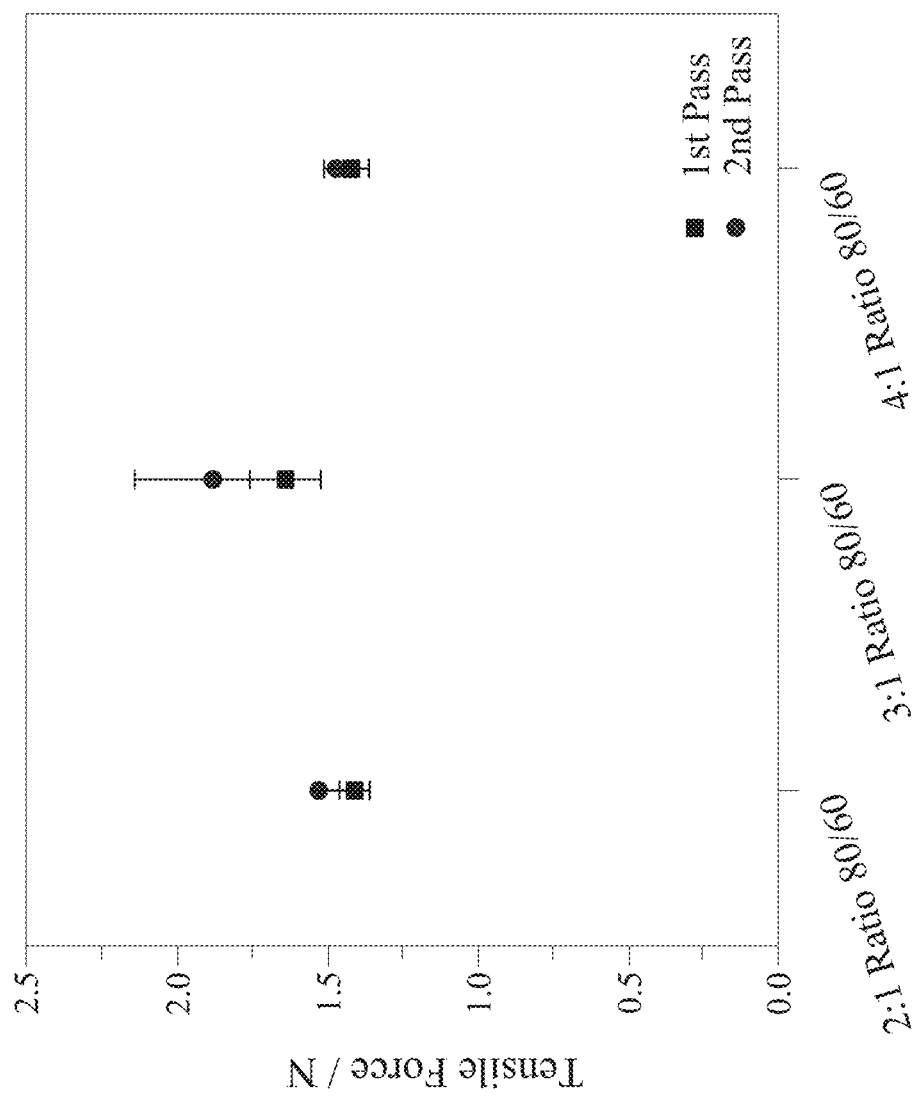
FIG. 6 provides a graph showing the mechanical strength of self-supporting electrode films made with 2:1, 3:1, 4:1 graphite:PTFE binder mixture ratios and including 3% PTFE fabricated by parallel processes.
Figure 7:
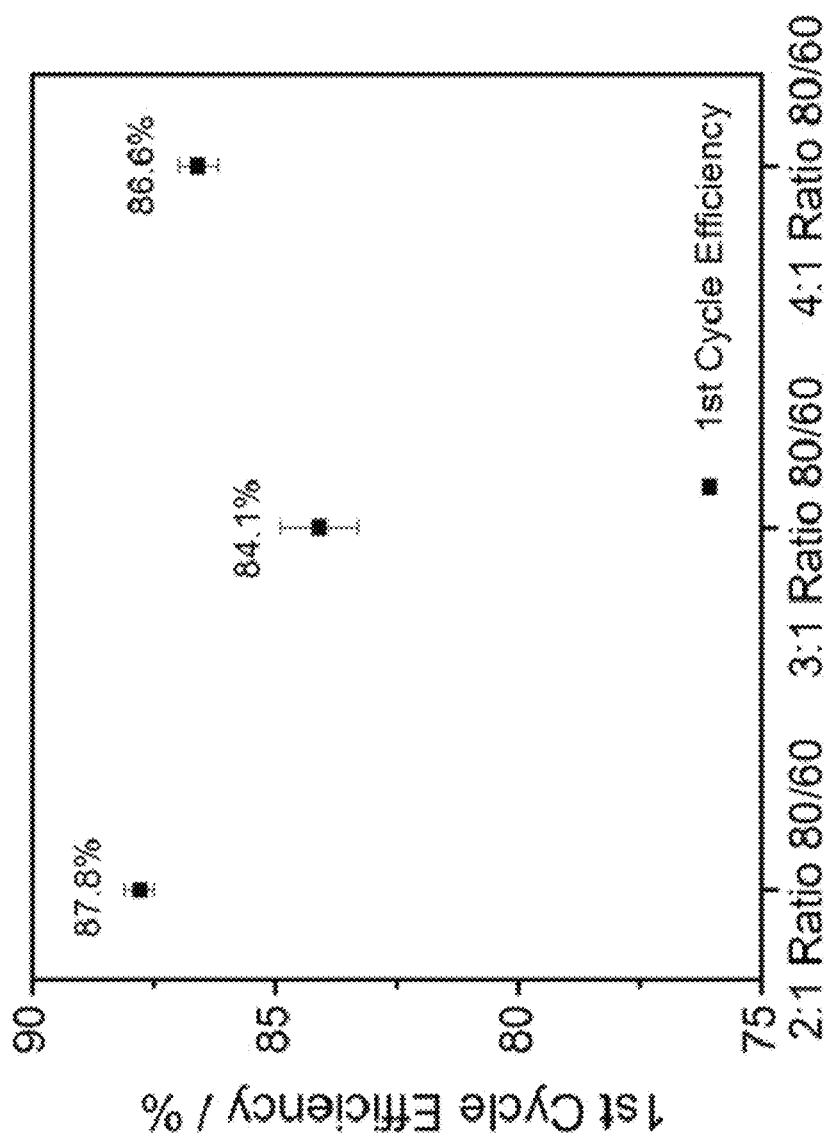
FIG. 7 provides a graph showing the first cycle electrochemical efficiency of energy storage devices with electrode films made with 2:1, 3:1, and 4:1 graphite:PTFE binder mixture ratios and including 3% PTFE fabricated by parallel processes.

A 20 mm×150 μm electrode film created from a 3:1 graphite-PTFE ratio binder mixture was also created and produced the strongest film, by tensile force, compared to 20 mm×150 μm electrode films made with 2:1 and 4:1 graphite-PTFE ratio binder mixtures, each having 3% PTFE loadings, and created by the general dry electrode methods previously described without lamination to the current collector and using a parallel process, as shown in FIG. 6. The electrode film created from a 2:1 graphite-PTFE ratio binder mixture showed a $1^{st}$ pass tensile force of about 1.6 N (tensile strength of about 0.55 MPa) and a $2^{nd}$ pass tensile force of about 1.4 N (tensile strength of about 0.45 MPa); the electrode film created from a 3:1 graphite-PTFE ratio binder mixture showed a $1^{st}$ pass tensile force of about 1.9 N (tensile strength of about 0.65 MPa) and a $2^{nd}$ pass tensile force of about 1.7 N (tensile strength of about 0.55 MPa); and electrode film created from a 4:1 graphite-PTFE ratio binder mixture showed a $1^{st}$ pass tensile force of about 1.5 N (tensile strength of about 0.5 MPa) and a $2^{nd}$ pass tensile force of about 1.5 N (tensile strength of about 0.5 MPa). However, first cycle efficiency of the electrode formed from the 3:1 graphite-PTFE ratio binder mixture was less than electrodes made with 2:1 and 4:1 graphite-PTFE ratio binder mixtures, as shown in FIG. 7. The electrode formed by the general method previously described and from the binder mixture of 2:1 graphite-PTFE ratio showed a first cycle efficiency of 87.9%; the electrode formed from the binder mixture of 3:1 graphite-PTFE ratio showed a first cycle efficiency of 84.1%; and the electrode formed from the binder mixture of 4:1 graphite-PTFE ratio showed a first cycle efficiency of 86.6%.

Figure 8A:
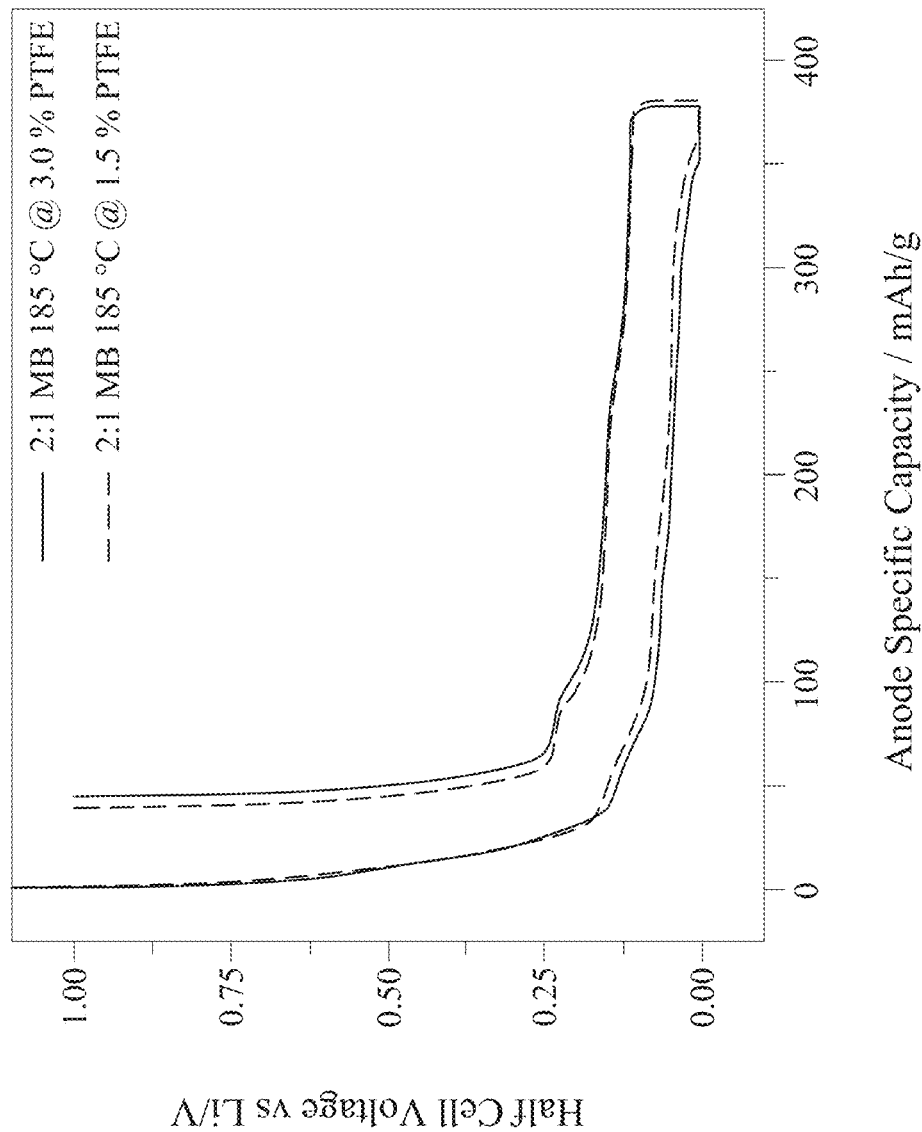
FIGS. 8A and 8B provide electrochemical first cycle profiles of energy storage devices with electrode films made with 2:1 graphite:PTFE binder mixture ratios including 1.5% PTFE and 3% PTFE fabricated by parallel processes and calendar rolled.
Figure 8B:
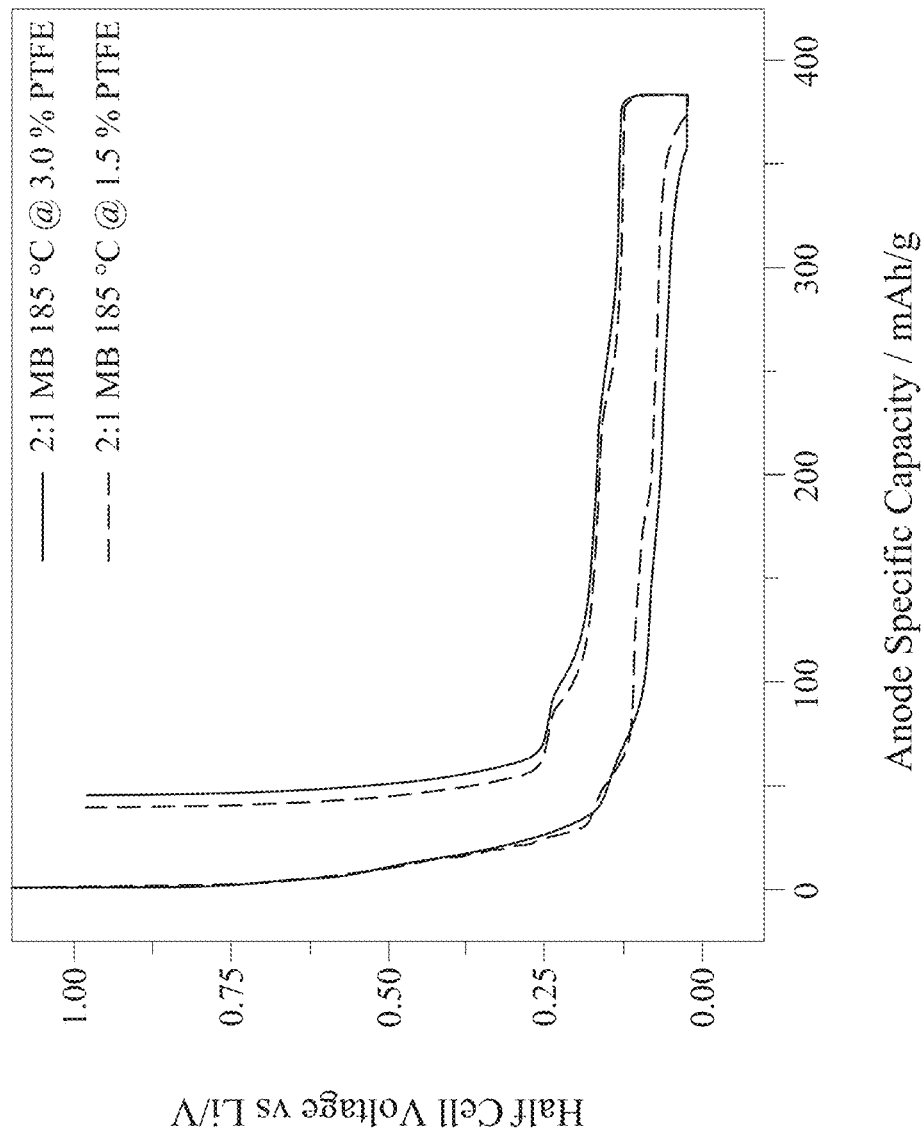

As electrode films made by the parallel processing method described herein show high tensile forces and strengths, the performance of electrode films with lesser PTFE binder loadings were evaluated. The current optimized first cycle electrochemical performance of a dry battery anode made using a 96% graphite powder, 1.5% PTFE and combined 2.5% CMC/PVDF loading in the final electrode film mixture and fabricated using a 2:1 graphite-PTFE ratio binder mixture with parallel processing were evaluated. This was compared to a dry battery anode similar to Sample 2 shown in FIG. 5 made using a 94% graphite powder, 3% PTFE and combined 3% CMC/PCDF loading in the final electrode film mixtures, and fabricated using a 2:1 graphite-PTFE ratio binder mixture. The electrode film with a 1.5% PTFE loading showed a measured first cycle efficiency of 88.7% as shown in FIG. 8A, which is improved from the 87.8% first cycle efficiency shown by Sample 2. The current optimized first cycle electrochemical performance of another dry battery anode made with a graphite-PTFE binder mixture used a 1.5% PTFE loading in the final electrode film mixture, and was fabricated using a 2:1 graphite-PTFE ratio binder mixture. This electrode film had a measured first cycle efficiency of 91.0% as shown in FIG. 8B.

Figure 9:
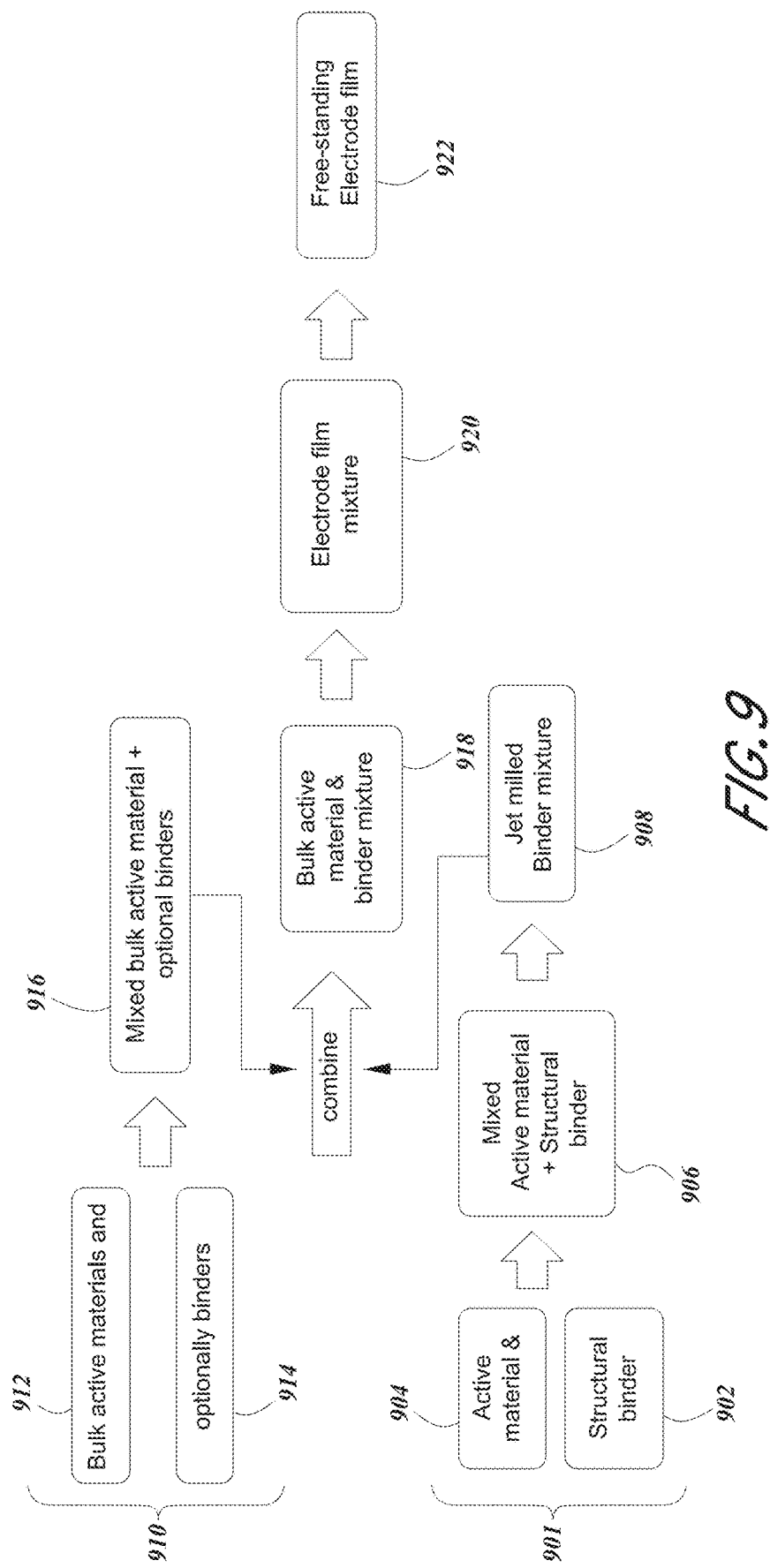
FIG. 9 provides an example of an implementation of a parallel processing scheme to form an electrode film.

An example of a specific parallel processing scheme is provided in FIG. 9. In the lower (as shown) parallel processing path 901 of the embodiment of FIG. 9, a first structural binder 902 and sacrificial active materials 904 are combined under nondestructive mixing. The structural binder 902 may be PTFE, and the sacrificial active material 904 may be graphite. The mixed structural binder and sacrificial active material form an initial binder mixture 906 that is then jet-milled in a high shear, high intensity process to form a binder mixture 908. In the upper (as shown) parallel processing path 910, a bulk active material mixture 916 is formed by mixing bulk active materials 912 with additional binders 914. The bulk active material 912 may be graphite. The additional binders 914 may be, for example, PVDF and/or CMC. The bulk active material mixture 916 is then combined with the binder mixture 908 in a gentle process to form a bulk active material and binder mixture 918, which is then processed by a low shear jet milling to form an electrode film mixture 920. The low shear jet milling may be performed at a high feed rate, for example, relative to the initial jet milling used to form the binder mixture 920. The electrode film mixture 920 may then be pressed or calendered into a self-supporting electrode film 922. Generally, no solvents are required in any stage of the process.

Figure 10:
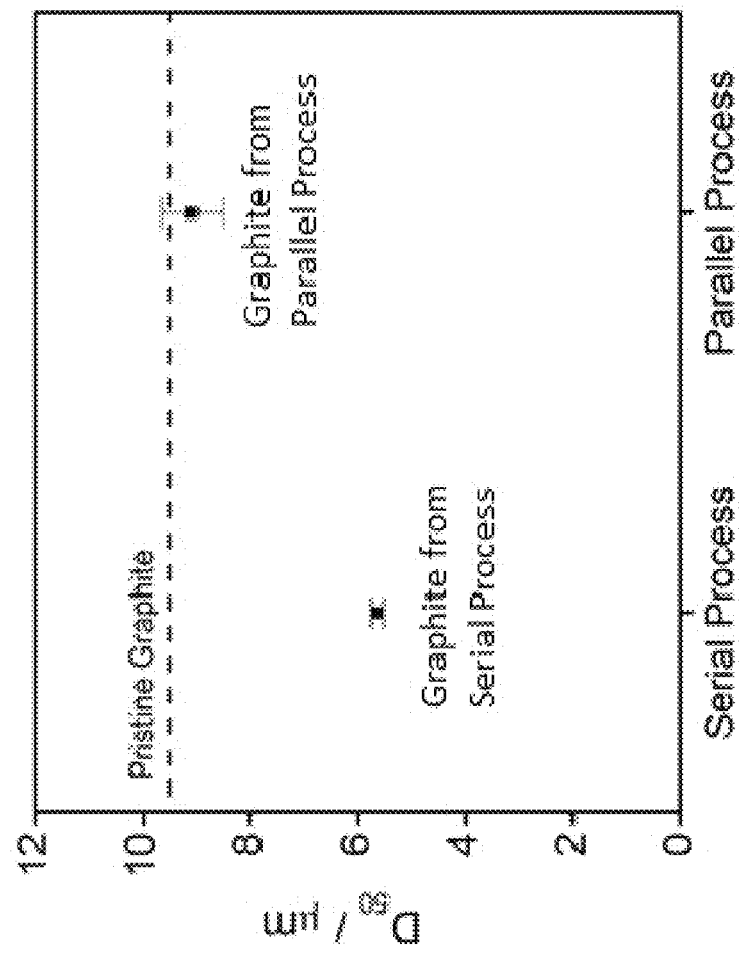
FIG. 10 provides a chart showing $D_{50}$ particle size distributions of graphite resulting from a conventional process ("serial process"), from a parallel process as provided herein ("parallel process"), and with respect to unprocessed pristine graphite.

An anode suitable for use in a battery was prepared according to the method of FIG. 9. The anode was composed of 96% graphite, with the binders being 2% PTFE, 1% CMC, and 1% PVDF. The binder mixture was prepared by jet-milling 4% of graphite (relative to the final electrode film mixture) with 2% PTFE (the "structural binder" in FIG. 9). The resulting graphite $D_{50}$ particle size distribution, which here constitutes the total active material in the final electrode film mixture, is about 9 μm and is shown in FIG. 10. For comparison, FIG. 10 also provides the graphite $D_{50}$ particle size distribution of an electrode film mixture prepared by a conventional dry electrode process in which all graphite (ie the total active material in the electrode film mixture) is jet-milled ("serial process"), which is under 6 μm. The electrode film mixture prepared by the parallel process showed only a small reduction in particle size relative to pristine graphite, wherein pristine graphite is shown to have a $D_{50}$ particle size distribution of about 9.5 μm. Additional data for the two films is provided in Table 1, wherein first cycle efficiency is measured in a lithium-based cell prepared by the methods described previously, and the tensile force is measured from 20 mm×150 μm electrode films. Although the first cycle efficiencies of lithium-based cells prepared by the parallel process with 2% PTFE loadings were measured to be 88.9%±0.3%, additional testing found a first cycle efficiency of 90.9%±0.1%. Similar results and/or benefits are anticipated for other active materials that can have similar performance-reducing effects as graphite in high shear processes.

TABLE 1

| PTFE | Process | Tensile Force on Breaking (N) | First Cycle Efficiency (%) |
|---|---|---|---|
| 2% | Serial | 0.65 ± 0.05 | 85.5 ± 0.8 |
| 2% | Parallel | 1.46 ± 0.07 | 88.9 ± 0.3 |

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount, depending on the desired function or desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A parallel processing method for preparing an electrode film comprising:
    providing an initial binder mixture comprising a first binder and a first active material;
    processing the initial binder mixture under high shear to form a secondary binder mixture;
    forming an electrode film mixture by mixing the secondary binder mixture with a second active material by a first nondestructive mixing process; and
    forming an electrode film from the electrode film mixture, wherein the electrode film is a free-standing film.

2. The method of claim 1, wherein mixing the secondary binder mixture with the second active material by the first nondestructive mixing process comprises mixing at least one of a lower pressure, lower velocity, and faster feed rate than the processing under high shear step.

3. The method of claim 1, wherein the first binder and the first active material are mixed by a second nondestructive mixing process to form the initial binder mixture prior to providing the initial binder mixture.

4. The method of claim 3, wherein at least one of the first and the second nondestructive mixing processes is an acoustic mixing process.

5. The method of claim 1, wherein mixing comprises mixing the binder mixture with an active material mixture, the active material mixture comprising the second active material.

6. The method of claim 5, wherein the active material mixture further comprises a second binder.

7. The method of claim 1, wherein the mass ratio of the first active material to the first binder is between about 1:1 to about 4:1 by weight.

8. The method of claim 1, wherein the second active material comprises a treated surface.

9. The method of claim 1, wherein the second active material within the electrode film comprises active material particle surfaces that are pristine.

10. The method of claim 1, wherein the combined $D_{50}$ particle size distribution of a total active material, including the first and second active materials, in the electrode film mixture is at least about 6 µm.

11. The method of claim 1, wherein the electrode film mixture is not exposed to a high shear process before being formed into the electrode film.

12. The method of claim 1, wherein the method is a dry fabrication process in which substantially no solvents are used.

13. The method of claim 1, wherein the first binder comprises a fibrillizable binder.

14. The method of claim 13, wherein the first binder comprises PTFE.

15. The method of claim 1, wherein the electrode film has a tensile strength of greater than about 0.25 MPa.

16. The method of claim 15, wherein the electrode film has a tensile strength of about 0.3 MPa to about 0.7 MPa.

17. The method of claim 1, wherein the electrode film comprises a total binder loading of about 1.5% to about 4% by mass.

18. The method of claim 1, further comprising attaching the electrode film to a current collector to form an electrode.

19. The method of claim 18, further comprising inserting the electrode within a housing to form an energy storage device.

20. The method of claim 19, wherein the energy storage device is a battery.

* * * * *